Feb. 14, 1956     C. H. THORLEY     2,734,549
AUTOMOTIVE BODY REPAIR TOOL
Filed April 22, 1952
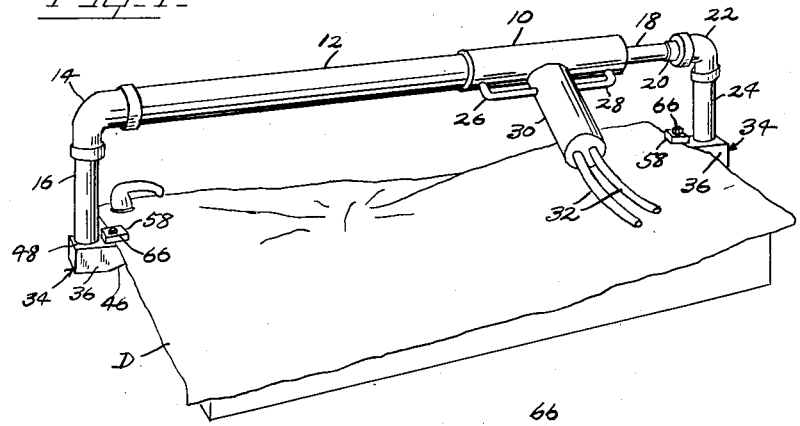
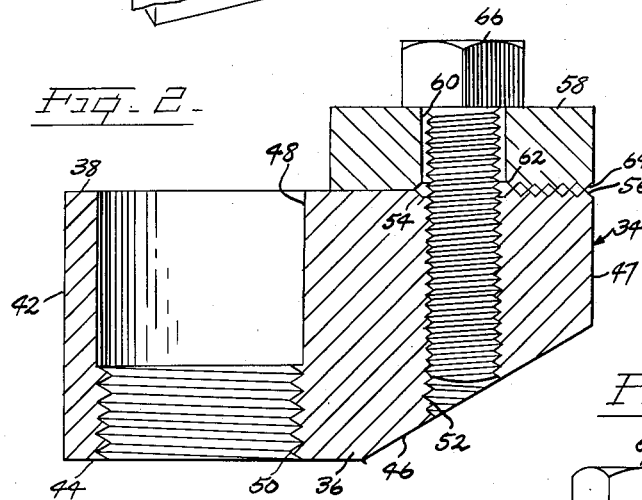
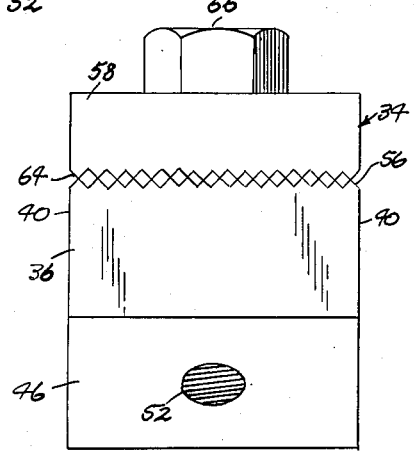
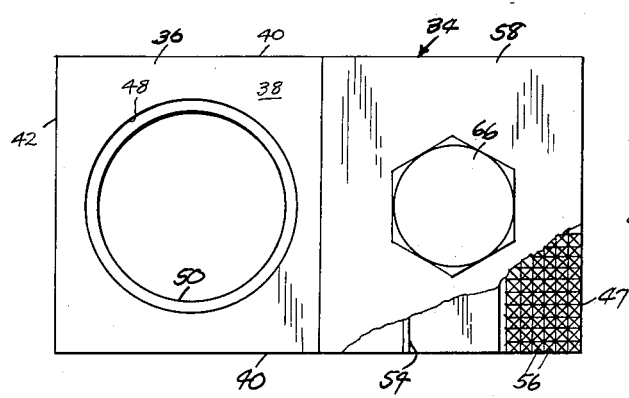
INVENTOR.
CECIL H. THORLEY
BY
McMorrow, Berman & Davidson
ATTORNEYS

United States Patent Office 2,734,549
Patented Feb. 14, 1956

2,734,549

AUTOMOTIVE BODY REPAIR TOOL

Cecil Howard Thorley, Croswell, Mich.

Application April 22, 1952, Serial No. 283,642

1 Claim. (Cl. 153—35)

This invention relates to a tool having its main application to automotive body repair work, but readily usable for related purposes in which large areas of sheet metal or the like have been dented or similarly damaged, and require straightening.

In that field of automotive repair work relating to the repair of damaged portions of an automotive vehicle body, the removal of dents covering large areas is, obviously, an operation that requires much time and skilled labor on the part of the body repair man.

This is particularly true in the case of automobile or truck doors, which are often seriously dented in collisions. To my knowledge, there has not previously been devised a tool or fixture adapted particularly for use by an automotive body repair man, for the purpose of stretching a vehicle door in a manner effective to eliminate the major portion of a large dent in the door, for the purpose of permitting the workman to complete the repair operation in a minimum amount of time.

The broad object of the present invention is to provide a tool that will be usable in this manner, in association with a conventionally formed hydraulic ram and pump.

Another important object is to provide a tool of the type stated which will be so formed as to pull outwardly upon opposed edges of the vehicle body part to be straightened, thus to be useable on such parts of a vehicle body as a door, fender, fender skirts, hood, and other parts having as a common characteristic a removable, panel-like formation.

Yet another object of importance is to provide a tool as described which will be equipped with clamping means adapted to engage opposed edges of the part to be straightened, said clamping means being novelly formed in a manner particularly adapting the same for engaging, and securely gripping, parts varying in thickness.

Still another object of importance is to provide a tool of the type stated in which the clamp means and the hydraulically extensible tool portion connecting the same can be shifted to selected positions of relative adjustment, whereby to permit the clamp means to be applied at selected locations along the edges of the part to be gripped.

Still another object is to provide a tool of the type stated in which there will be embodied a plurality of separable parts, so formed and connected as to permit the substitution of other parts of different lengths, whereby to adapt the tool for use on automotive body parts of different sizes.

A still further object of importance is to provide a tool as described which will be rugged, efficient in use, and capable of manufacture at relatively low cost.

Other objects will appear from the following description, the claim appended thereto, and from the annexed drawing, in which like reference characters designate like parts throughout the several views, and wherein:

Figure 1 is a perspective view of a tool formed in accordance with the present invention, as it appears when applied to an automotive vehicle door to be straightened;

Figure 2 is an enlarged longitudinal sectional view of one of the clamps;

Figure 3 is a top plan view of the clamp in which a portion has been broken away; and Figure 4 is an end elevational view of the clamp as it appears when viewed from the right of Figure 2.

The tool constituting the present invention has, as certain components thereof, parts which in and of themselves are conventional and well known in the art. Accordingly, these parts will not be described in detail. Thus, I provide a cylindrical hydraulic ram housing 10, fixedly and separably connected to one end of an elongated, tubular, support member 12. The support member 12, in this connection, can be a suitable length of pipe, threaded at its opposite ends, for connection to one end of the ram housing 10 and to an elbow 14.

The elbow 14 is threadedly engaged with a depending, tubular arm 16 which also can be formed from a length of pipe material, said arm being relatively short as compared to the support member 12.

It will be understood that the housing 10 encloses a slidable piston, said piston being connected to the inner end of a ram shaft 18, that projects from the housing 10 in a direction opposite to that in which the support member 12 is extended from said housing.

The ram shaft 18 is threaded at its outer end, for engagement with an adapter 20, said adapter being threadedly engaged in one end of an elbow 22. The elbow 22 has a depending end threadedly engaging the upper end of an arm 24, said arm being coextensive in length with the arm 16.

The hydraulic ram includes branch pipes 26, 28, extending into communication with opposite ends of the ram housing 10, the piston, not shown, being slidable in the housing between the branches. The branches, as shown in Figure 1, extend into communication with a hydraulic cylinder 30, fluid flowing into and out of the cylinder 30 under pressure through the hoses 32. The hoses 32, in actual use of the device, would be connected to a conventionally formed hydraulic pump, not shown.

From the description which has so far been provided, it will be seen that operation of the hydraulic ram will cause the shaft 18 to be extended or retracted relative to the housing 10, as desired, thus to draw the arms 16, 24 toward one another or increase the distance between said arms, as desired.

Secured to the lower ends of the arms 16, 24 respectively are clamps, designated generally by the reference numeral 34. The clamps are of identical, though opposite construction, and my description of the clamps will accordingly be confined to only one of them.

Each clamp includes a base block 36 formed from a solid piece of steel or like material, said block having a flat top surface 38 extending through the full length thereof. The block is also provided with flat side walls 40 disposed perpendicularly to the flat top surface, and with a flat, vertical, outer end wall 42.

The bottom wall of the block is formed with a flat, outer bottom wall portion 44 that is parallel to the top surface or wall 38, said bottom wall portion extending from the outer end wall 42 to a location slightly beyond the midlength point of the block, and merging into an inclined, inner bottom wall portion 46. The wall portion 46 extends to the inner end wall 47 of the base block, said inner end wall 47 being parallel with the outer end wall 42.

Adjacent the outer end wall 42 of the base block, I form in said block an opening 48 of large diameter, said opening extending vertically of the block and communicating at its opposite ends with the top and bottom walls 38, 44 respectively. For ease in assembling the clamp with the arm 16, the upper portion of the opening 48 is preferably left unthreaded, the lower end portion of the opening being provided with threads 50 adapted to receive corresponding threads formed upon the lower end of the arm 16 or arm 24, as the case may be.

The inner end portion of the base block is provided with a bore 52, threaded from end to end thereof. At its upper end, the bore 52 is in communication with the top wall 38 of the block, the lower end of the bore opening upon the inclined bottom wall portion 46. Preferably, a shallow recess 54 is formed in the top wall portion 38, and may extend fully from side to side of the base block, said shallow recess communicating, medially between the opposite sides of the base block, with the upper end of the threaded bore 52.

I form on the top wall 38 of the base block a series of gripping teeth 56, said teeth being pyramidal in shape and being arranged in intersecting, longitudinal and transverse rows (see Figure 3). The teeth 56 are disposed over an area extending fully from side to side of the block, and from the inner end wall 47 to the adjacent side wall of the shallow recess 54.

A clamping block has been designated by the reference numeral 58, and I form this block to a rectangular, generally flattened shape. The clamping block, as will be noted from Figure 3 or 4, extends fully from side to side of the clamp, but is formed with a back wall disposed substantially at the midlength location of the base block, so as to leave the opening 48 of the base block fully exposed for connection of an arm 16 or 24 to said base block.

Formed centrally in the clamping block 58 is a smooth walled opening 60, that is of a diameter substantially greater than the diameter of the threaded bore 52. The opening 60, as seen from Figure 2, is in registration with the bore 52, and extends fully from the top to the bottom surfaces of the clamping block. At its lower end, the opening 60 is in communication with the shallow recess 62 opposing the recess 54 of the base block. The recess 62, as will be understood, extends fully from side to side of the clamping block 58.

Formed on the underside of the clamping block 58 are pyramidal gripping teeth 64, said teeth being arranged in intersecting longitudinal and transverse rows, so as to cause the point of each tooth 64 to register with a corresponding tooth 56 of the base block. The teeth 64 extend fully from side to side of the clamping block, and from the inner wall of the clamping block to the adjacent wall of the recess 62 thereof.

A clamping bolt 66 is extended through the clamping block and base block, said bolt being threadedly engaged in the bore 52 of the base block. At its upper end, the bolt is formed with a wrench-receiving head overlying the clamping block, said head being adapted to receive a wrench or similar tool for the purpose of forcing the clamping block against the base block.

As will be noted from Figure 2, the opening 60 is of substantially greater diameter than the external diameter of the threads of the bolt 66. The purpose of this construction is to permit the clamping block 58 to rock upwardly from the base block, at its toothed or serrated end.

Thus, in use, the bolt 66 would first be backed out of the threads 52 to loosen the clamping block 58, after which the clamps of the tool are applied to opposite edges of a door D or other automotive vehicle body part to be straightened. Said edges of the door are disposed between the toothed surfaces of the clamping blocks and base blocks of the clamps used in the tool. Thereafter, the bolts 66 of the respective clamps are tightened, thus to cause the clamping block to be forced against its associated base block and thereby engage the gripped portion of the door tightly therebetween.

It is believed to be an important characteristic of the invention, in this regard, that the clamps are adapted to receive body parts of varying thicknesses, with the gripped part being securely held, in each instance, when the tool is placed in use.

Assuming that the clamps have been applied to opposite edge portions of a door D to be straightened, fluid is forced under pressure into the hydraulic ram, as a result of which the ram shaft 18 is forced outwardly of the ram housing 10. This causes the opposite edge portions of the door to be drawn away from one another, and the result is obtained of stretching the door transversely or longitudinally, as the case may be, with a view to the removal of dents. After the door has been stretched to the desired extent, the bolts 66 are loosened, permitting the door to be removed from the tool, and the workman is then able to finish the repair operation in a minimum time.

If desired, the support member 12 can be removed, and another support member substituted therefor, thus to adjust the overall length of the tool preliminary to the supplying of fluid under pressure thereto. The same is true of the arms 16 and 24.

It is also to be noted that the tool construction illustrated and described is one which does not require that the clamps 34 be aligned with one another transversely or longitudinally of the vehicle body part to be straightened. Thus, the clamp 34 can, instead of being aligned longitudinally with the support member and ram shaft 18 in the manner illustrated in Figure 1, be disposed angularly relative to said support member and ram shaft, and the support member and ram shaft can be extended angularly across the part to be straightened, instead of being extended directly transversely or longitudinally of said part. This permits the workman to apply the tool to the vehicle body part in any manner desired, to cause stretching pressures to be exerted on said part at particular locations found by him to be the most desirable in effecting the removal of dents.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

In an automotive vehicle body repair tool, a clamp for engaging a work piece to be straightened comprising: a relatively elongated, generally rectangular, solidly constituted base block having a flat top surface extending through the full length thereof, flat side walls disposed perpendicularly to the flat top surface, flat, vertical end walls, and a bottom wall formed with a flat outer bottom wall portion at one end of the block parallel to the top surface of the block, said bottom wall portion terminating at a location adjacent the midlength point of the block and merging at said location into an inclined inner bottom wall portion extending fully to the other end of the block, said block having a large diameter opening extending vertically therethrough and communicating at its opposite ends with the top wall surface and said outer bottom wall portion respectively, said opening being threaded, to receive the complementarily threaded support element on which the base block is mounted at a selected location longitudinally of said element and in a selective position of rotatable adjustment relative to said support element, the base block having a vertical bore threaded from end to end thereof in parallelism with said opening, said vertical bore communicating between the top surface of the block and said inclined inner bottom wall portion, the top surface of the block being formed with gripping teeth extending fully from side to side of the block and from said bore to the adjacent end wall of the block; a clamping block having a rectangular, generally flattened shape seated upon said top surface of the base block and extending fully from side to side of the base block, said clamping block having a back wall disposed substantially at the midlength location of the base block, the clamping block having a smooth-walled opening registered with said bore and formed to a diameter substantially greater than the diameter of said bore, said opening of the clamping block extending fully from the top to the bottom surfaces of the clamping block, the clamping block having a bottom surface engaged against the top surface of the base block and formed with downwardly facing teeth complementing the teeth of the base block and extending over an area corresponding to that over which the base block teeth extend; and a connecting bolt threaded in said bore and extending through the clamping block opening, said connecting bolt when threaded in one direction within the bore being adapted to free the clamping block for rockable movement upon the base block, said bolt when threaded in an opposite direction having its head engaged against the top surface of the clamping block, to force the same into engagement with a work piece interposed between the toothed surface of the clamping and base blocks.

References Cited in the file of this patent

UNITED STATES PATENTS

| | | |
|---|---|---|
| 1,524,753 | Schrverin | Feb. 3, 1925 |
| 1,739,488 | Thayer | Dec. 10, 1929 |
| 1,832,968 | De Armey | Nov. 24, 1931 |
| 2,059,972 | Smith et al. | Nov. 3, 1936 |
| 2,135,278 | Countryman | Nov. 1, 1938 |
| 2,165,503 | Pfauser | July 11, 1939 |
| 2,260,708 | French | Oct. 28, 1941 |
| 2,463,966 | Hanschild | Mar. 8, 1949 |